US005487535A

United States Patent [19]

Carter et al.

[11] Patent Number: 5,487,535
[45] Date of Patent: Jan. 30, 1996

[54] SUSPENSION STRUT METAL-TO-METAL JOUNCE STOP

[75] Inventors: Robert L. Carter, Gibraltar; Sophia C. Barr, Birmingham, both of Mich.

[73] Assignee: Chrysler Corporation, Highland Park, Mich.

[21] Appl. No.: 349,297

[22] Filed: Dec. 5, 1994

[51] Int. Cl.⁶ ................................................. B60G 15/00
[52] U.S. Cl. ........................... 267/220; 267/33; 267/293; 280/668
[58] Field of Search ............................ 267/220, 33, 292, 267/293, 294, 140, 152, 153, 195, 219, 258; 280/668, 710, 712; 188/321.11

[56] References Cited

U.S. PATENT DOCUMENTS

| | | | |
|---|---|---|---|
| 3,263,985 | 8/1966 | Planta | 267/63 |
| 3,675,881 | 7/1972 | Caldwell | 267/153 X |
| 4,219,189 | 8/1980 | Scrivo et al. | 267/33 |
| 4,397,452 | 8/1983 | Fouts | 267/220 |
| 4,681,304 | 7/1987 | Hassan | 267/220 |
| 4,747,587 | 5/1988 | Farrell | 267/220 |
| 4,804,169 | 2/1989 | Hassan | 267/220 |
| 4,805,886 | 2/1989 | Hassan | 267/220 |
| 5,078,370 | 1/1992 | McClellan | 267/220 |
| 5,112,077 | 5/1992 | Makita | 267/220 X |
| 5,120,031 | 6/1992 | Charles et al. | 267/220 |
| 5,342,029 | 8/1994 | Carter | 267/220 |

FOREIGN PATENT DOCUMENTS 2050557  1/1981  United Kingdom ................ 267/220

Primary Examiner—Robert J. Oberleitner
Assistant Examiner—Peter M. Poon
Attorney, Agent, or Firm—Christopher A. Taravella

[57] ABSTRACT

An automotive vehicle suspension shock-absorbing assembly providing a metal-to-metal jounce stop arrangement. The lower extremity of a cylindrical canister, extending downwardly from an upper coil spring seat, defines an upper angular jounce stopper while a striker plate, fixed on the upper end of a shock-absorber unit, is formed with a downwardly off-set annular lower stopper ledge. The arrangement enables maximum jounce travel while limiting compression of the elastomeric jounce bumper, encircling the shock piston rod, to a predetermined axial dimension thereby substantially increasing its service life. Further, the canister shields the bumper during full jounce obviating damage thereto. The canister lower end portion has an inturned shoulder from which an inwardly offset ring depends terminating in an exterior return bent hemmed flange. The return flange upper free edge is axially spaced subjacent the inturned shoulder providing an external annular groove sized to capture an elastomeric dust shield retaining rib.

5 Claims, 2 Drawing Sheets

SUSPENSION STRUT METAL-TO-METAL JOUNCE STOP

BACKGROUND OF THE INVENTION

This invention relates to automotive suspensions and more particularly to an improved shock-absorbing assembly providing a metal-to-metal jounce stop arrangement which allows increased wheel travel during full jounce stroke while insuring extended service life for the elastomeric jounce bumper surrounding the shock piston rod.

An example of a suspension strut upper support mount having an improved spring characteristic is found in Shiratori et al. U.S. Pat. No. 4,465,296 issued Aug. 14, 1984. The invention provides a rubber block having a predetermined configuration for receiving oscillating loads in a relatively smooth manner.

The Farrell U.S. Pat. No. 4,747,587 issued May 31, 1988 assigned to the assignee of the present application, discloses a low profile strut isolator and jounce bumper upper mount providing a compact resilient assembly adaptable for a vehicle having a reduced hood line. The Ferrel assembly comprises an upper mounted seat assembly including an inverted cup member having an upper body portion and a lower neck portion joined by an integral reverse-bend stop flange. A convoluted elastomeric sleeve, having its upper end fixed to the cup neck portion, extends axially a predetermined distance surrounding the upper end of the strut outer casing with the suspension strut supporting the vehicle in its statically loaded or design state. The suspension strut outer support casing includes a contact ring adapted to engage the convoluted sleeve providing jounce bumper cushioning of the strut.

The Kawaura U.S. Pat. No. 4,478,396 issued Oct. 23, 1984 discloses an elastic support structure for a vehicle suspension shock comprising a first rigid member to be subjected to shocks and vibrations produced in a wheel assembly, a second rigid member to which shocks and vibrations may be transferred from the first rigid member, and an elastic member composed of a least two segments similar in geometry constructed independently of each other formed with annular grooves.

The McClellan U.S. Pat. No. 5,078,370 issued Jan. 7, 1992 is an example of a vehicle front suspension strut having integrated jounce and rebound stops. In the McCellan patent the suspension spring rebound load is placed on a lower rebound stop member of the mount and the suspension jounce load is placed on an upper jounce stop member of the mount.

The Okuzumiis U.S. Pat. No. 4,934,730 issued Jun. 19, 1990 an example of a vehicle front suspension strut wherein the upper end of the strut piston rod is engaged in an inner sleeve of a mount insulator for limited axial movement relative to the inner sleeve.

SUMMARY OF THE INVENTION

It is a feature of the present invention to provide a shock-absorbing assembly for use in a vehicle suspension having an improved metal-to-metal stop arrangement enabling maximum jounce travel while limiting resultant compression of an elastomeric jounce bumper on the shock piston rod to a predetermined axial dimension thereby substantially increasing the service life of the bumper.

It is a further feature of the present invention to provide an improved shock-absorbing assembly metal-to-metal jounce stop for use in a vehicle suspension as set forth above wherein the lower extremity of a cylindrical canister, which axially extends from an upper spring seat of the assembly, defines an annular upper jounce stopper adapted to contact an annular lower jounce stopper off-set axially below the upper end of the shock cylinder. The arrangement results in achieving maximum jounce travel while limiting compression of the jounce bumper to a predetermined axial dimension thereby substantially increasing its service life. An additional advantage of the arrangement is that the canister concentrically surrounds the jounce bumper with the assembly in its maximum jounce mode thereby shielding the compressed bumper against damage.

It is still another object of the present invention to provide an improved shock-absorbing suspension strut assembly as set forth above wherein the cylindrical canister lower end is formed with an inturned shoulder defining a depending reduced diameter ring. The ring lower end terminates in a return bent exterior flanged hem circumscribing the ring such that the flanged hem and the canister exterior define common concentric surfaces. The inturned shoulder and axially spaced flanged hem upper edge defines an external annular groove sized to capture an internal locking rib of a flexible dust tube thereby retaining the tube during reciprocal travel of the assembly.

These and other objects and advantages of the present invention will be readily apparent by reference to the following description of the preferred embodiment and the accompanying drawing which shows a vehicle suspension strut incorporating the improved upper mount and related structure.

DETAILED DESCRIPTION OF THE INVENTION

Figure 1:
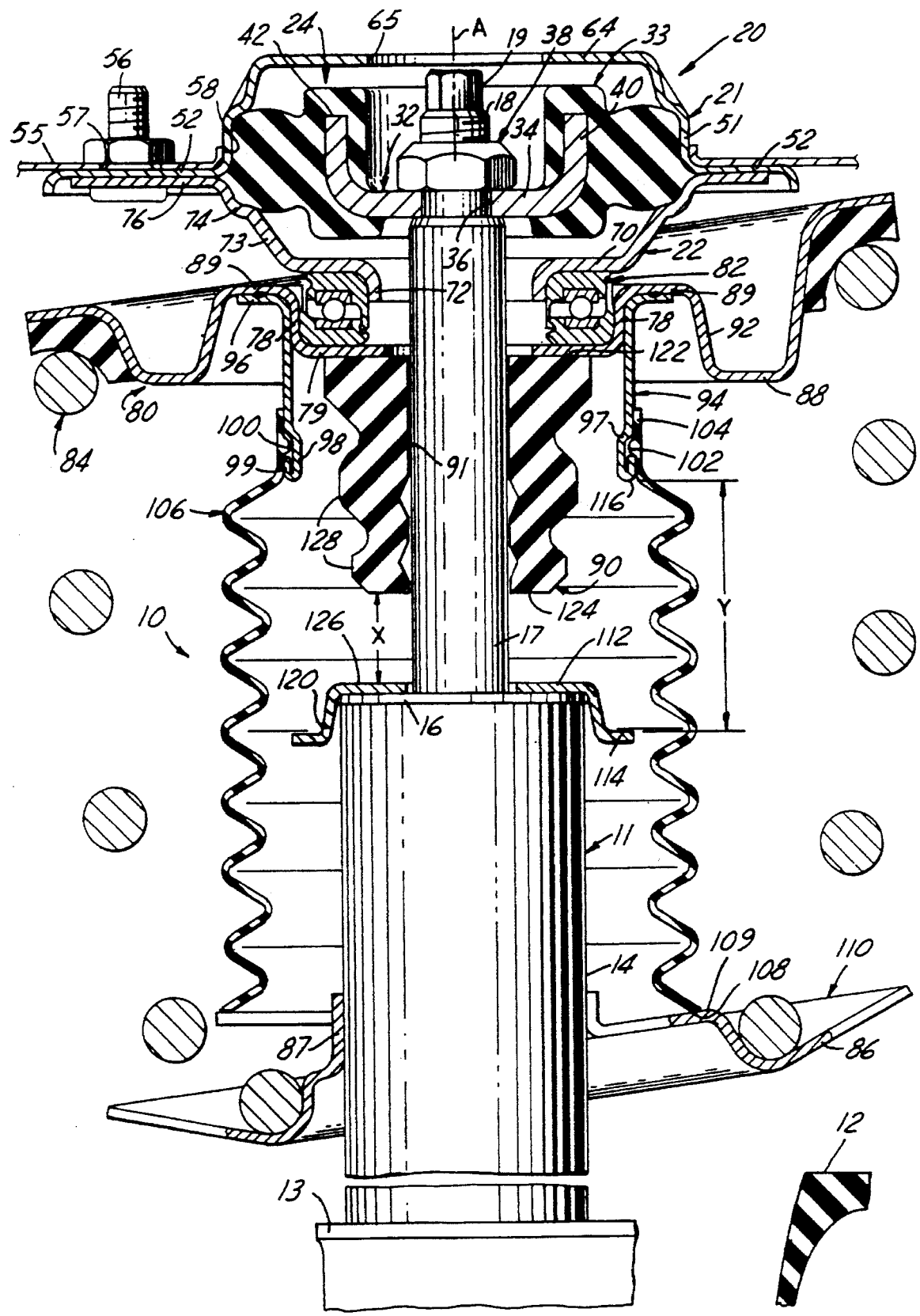
FIG. 1 is a fragmentary front view, partly in cross section, of a suspension shock-absorbing assembly in its neutral mode incorporating a metal-to-metal jounce stop arrangement in accordance with the present invention.

Referring now to the drawing, there is shown in FIG. 1 a portion of a vehicle front suspension shock-absorbing assembly 10 in its neutral mode incorporating a hydraulic shock-absorbing unit 11 interconnecting the vehicle sprung mass or body portion and a vehicle unsprung mass supported by a front wheel 12. The shock-absorbing unit 11 has a mounting bracket, partially depicted at 13, connected to a steering knuckle (not shown). The mounting bracket provides a lower support for outer cylindrical support strut tube 14 of the unit 11 which extends upwardly therefrom with the tube secured in the lower bracket 13 as by welding. The upper end of the unit 11 is closed by upper cap 16, welded or otherwise secured to the support tube 14. Reference may be had to the U.S. Pat. No. 5,078,370, mentioned above, which patent discloses details of conventional shock absorber components and is incorporated by reference herein.

A cylindrical piston rod 17 extends axially upwardly from a conventional valved piston (not shown) slidably mounted in a cylindrical inner tube (not shown) radially spaced inwardly from the unit support tube 14 which provides a reservoir for the hydraulic dampening fluid of the shock absorbing unit 11. The piston rod 17, which extends upwardly through an opening in the upper cap, has a reduced diameter threaded upper portion 18 terminating in an upper hex end 19. The piston rod 17 is removably attached to an improved upper low profile shock absorber upper mount generally indicated at 20. Thus, the rod 17 is disposed in telescoping relationship with the unit 11 whereby shocks are absorbed as the rod telescopes into the unit. As seen in FIG. 1, the upper mount 20 comprises an outer two-part housing defined by an upper hat-shaped closure 21 and a lower closure 22. Each closure is in the form of one-piece members formed of sheet metal, adapted to house a composite isolator mount 24 in an axially pre-loaded manner.

The upper mount 20 further comprises an annular inner cup 32 and an elastomeric ring 33 concentrically disposed about the shock principal axis "A". The inner cup 32 has a closed bottom wall 34 formed with a central hole 36 having its center aligned on the shock axis so as to receive therethrough the piston rod upper threaded portion 18 for threaded attachment by nut 38. The cup 32 has an upstanding cylindrical inner side wall 40 terminating at its upper end in jounce stop means in the form of an annular end 42.

The hat-shaped upper closure member 21 is formed with a cylindrical axially upstanding outer wall portion 51 concentrically disposed around the cup inner side wall 40 defining an annular space therebetween. The upper closure member wall portion 51 has its lower end terminating in a radially outwardly extending attaching flanged brim 52. The flanged brim 52 is removably fixed to a vehicle body strut receiving sheet metal panel or tower 55, as by bolts 56, extending through holes 57 upon the assembly 10 being positioned in panel circular opening 58.

The upper closure member 21 terminates at its upper end in a horizontal annular cap ring 64 forming a central access aperture 65. The lower closure member 22 defines a circular base collar 70 having a central flanged opening defined by a downturned annular flange 72 concentrically disposed about the principal axis "A". The collar 70 is shown boarded by an upwardly and outwardly diverging wall portion 73 having its upper terminus formed with a outwardly bowed annular seat portion 74. The shoulder portion 74 terminates at its upper end in a radially outwardly extending terminal flange 76 in subjacent flatwise contact with the underside of the cover member flanged brim 52.

The collar 70 and its down-turned flange 72 is disposed above a subjacent upturned annular flange 78 and radially inwardly extending central base disc 79 of upper coil spring seat 80. As a result an annular cavity is formed sized to snugly receive therein a circular ball bearing ring assembly 82 concentrically disposed about the axis "A".

The upper annular spring seat 80 is resiliently supported on the upper end coil of an helical suspension coil spring generally indicated at 84. The coil spring 84 spirals around the shock outer support tube 14 and extends upwardly from an annular lower spring support seat member 86 axially positioned above the mounting bracket 13. The member 86 has an upstanding neck portion 87 welded or otherwise secured to the support tube 14.

The upper one-piece sheet metal spring seat 80 is formed with an outer upwardly opening U-sectioned trough section defined by a radially extending lower bight wall 88 and an inner downwardly opening U-sectioned trough section defined by a radially extending upper bight wall 89. It will be noted that the inner trough section bight wall 89 concentrically surrounds the ball bearing assembly 82 while the outer trough section bight wall 88 concentrically surrounds an upper portion of an elastomeric jounce bumper 90. The jounce bumper 90 has an axial bore 91 receiving therethrough, in a press-fit manner, an upper portion of the shock piston rod 17. FIG. 1 shows the outer trough lower bight wall 88 and the inner trough upper bight wall 89 interconnected by a common flange 92 shown angled upwardly and inwardly from the radially extending outer bight wall 88 to the radially extending inner bight wall 89.

A concentric vertically disposed cylindrical canister 94 has an upper open end sized to snugly encircle the spring seat upturned annular flange 78. The canister 94 upper end terminates in an out-turned radial collar 96 adapted for flush attachment, as by spot welds, with an opposed underside of spring seat upper bight wall 89. The canister 94, which is concentrically disposed about the strut axis "A", extends downwardly from the spring seat a predetermined dimension with a lower portion thereof formed with an integral inturned annular shoulder 97.

The shoulder 97 has depending therefrom a reduced diameter concentric ring 98 terminating in a return bent flanged hem 99 folded back upon the ring exterior surface. The hem 99 free end is axially spaced a predetermined dimension from the shoulder 97 so as to form an external annular groove 100. The groove 100 is sized to receive therein an annular rib 102 formed on the internal surface of upper neck portion 104 provided on an elastomeric flexible accordion-like dust tube 106. The dust tube 106 encircles the upper portion of the strut cylinder 14 with the dust tube lower extremity 108 shown contacting high surface 109 of lower coil spring seat 110.

As viewed in FIG. 1 the strut cylinder 14 upper end cap 16 is shown supporting a striker plate 112 formed with an annular downwardly off-set radially extending lower stopper ledge 114. It will be seen that the concentric stopper ledge 114 is in vertically spaced subjacent alignment with the annular folded upper stopper edge juncture 116 of the canister 94. Thus, as seen in FIG. 2, with the shock-absorbing assembly 10 in its maximum jounce mode the upper stopper juncture 116 is shown contacting the lower stopping ledge 114 providing a metal-to-metal jounce stop arrangement.

Figure 2:
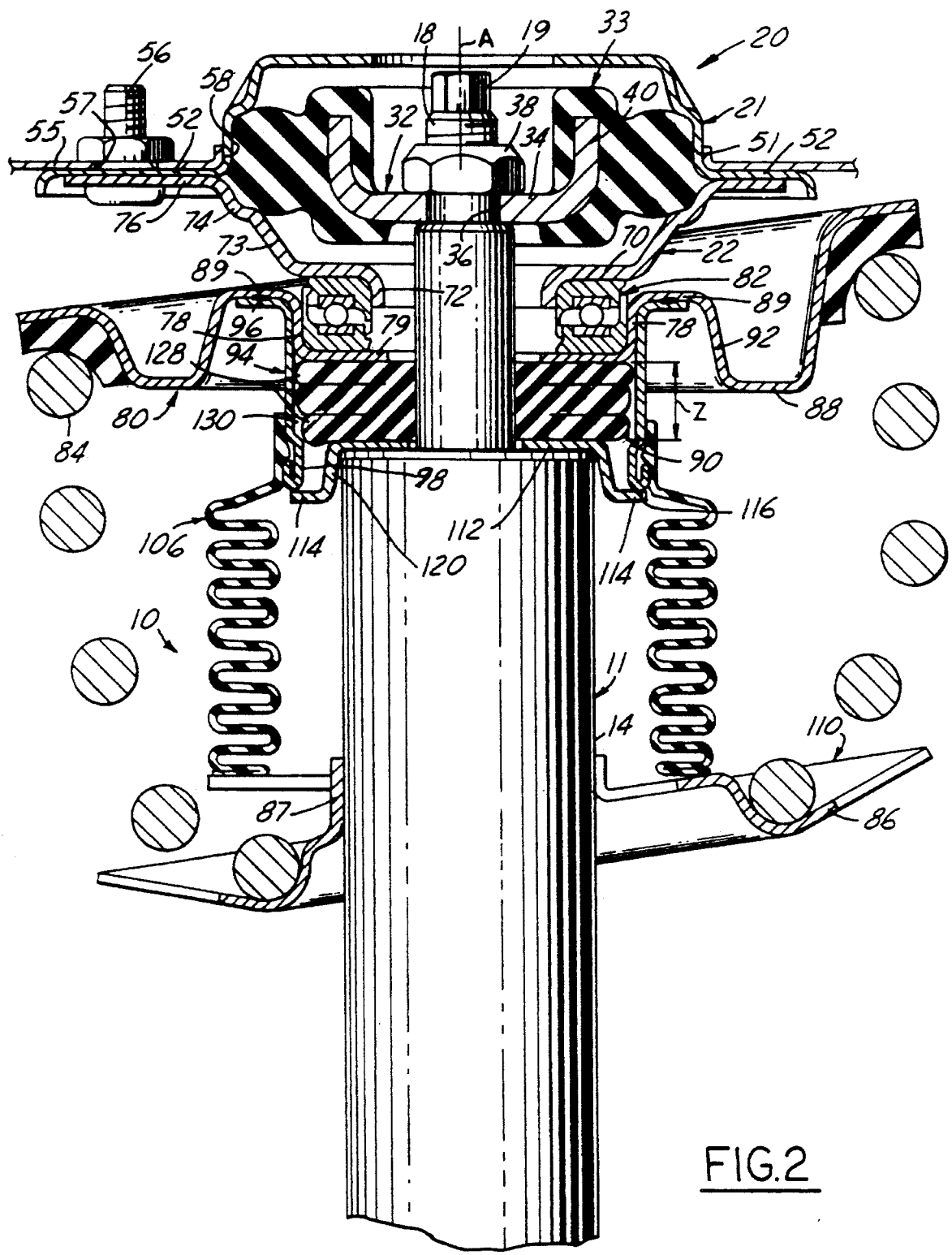
FIG. 2 is a view similar to FIG. 1 showing the shock absorbing assembly in its maximum jounce mode.

As viewed in FIG. 2 the jounce bumper 90 is compressed to a predetermined axial dimension "Z" in its maximum jounce mode so as to be completely shielded by the canister 96 thereby obviating possible damage to the bumper. Such damage could occur with an un-shielded bumper wherein the shock axis is moved off-center during full jounce resulting in asymmetric outward radial bumper expansion causing the bumper to be sheared or cut by the canister lower extremity. It will be appreciated that, by virtue of the stopper ledge 114 being off-set below the striker plate upper contact surface 126, the bumper is axially spaced from the metal-to-metal jounce stop contact area between the lower stopper ledge 114 and upper stopper juncture 116 further insuring against damage to the bumper 90.

It will be further noted that the striker plate 112 is formed with a frusto-conical shaped skirt 120 adapted to provide a lead-in surface for the canister stopper juncture 116. The lead-in skirt 120 tends to correct for axial misalignment between the canister lower extremity and the jounce lower stopper ledge 114.

With reference to FIG. 1 it will be seen that the jounce bumper 90 has an upper end face 122 in flush abutment with the underside of the spring seat 80. The bumper 90 lower end face 124 is shown axially spaced a predetermined dimension "X" from the striker plate upper opposed surface 126. It will be noted that the dimension "X" defines the free vertical travel of the jounce bumper 90 prior to its lower end face 124 contacting the striker plate upper surface 126. The jounce bumper exterior is shown formed with a plurality of annular convolute portions 128 about which the bumper folds when undergoing axial compression between the spring seat central disc 79 and opposed striker plate upper surface 126.

In FIG. 1 it will be seen that the canister lower extremity, in the form of annular folded stopping juncture 116, is axially spaced a predetermined dimension "Y" from the vertically aligned annular stopper ledge 114. The dimension "Y" defines the potential or maximum axial jounce travel when the assembly 10 is in its design static mode.

It will be observed that with the assembly 10 in its full or maximum jounce mode of FIG. 2 the jounce bumper undergoes a maximum compression set by predetermined axial dimension "Z". The dimension "Z" defines the vertical height of bumper chamber 130 provided at the full jounce mode. By virtue of providing a metal-to-metal full jounce stop while limiting the degree of bumper compression to a predetermined applicant has greatly extended the service life of the bumper elastomeric material. It will be further observed in FIG. 2 that upon the canister lower extremity stopper juncture 116 contacting the striker plate stopper flange 114 the canister not only surrounds the compressed bumper 90 but extends a predetermined dimension below the bumper lower end face 124. As a result each bumper convolute 128, upon being bowed radially outwardly, is contained within the chamber 130 thereby obviating damage thereto.

While only one embodiment of the present invention has been described, other embodiments and modifications are possible without departing from the scope of the appended claims.

What is claimed is:

1. A shock-absorbing assembly for use in a suspension system for an automotive vehicle, the assembly operatively connected between sprung and unsprung masses of the vehicle, the assembly comprising a shock unit having a piston rod extending through an opening in one upper end thereof disposed for reciprocal movement along a principal axis of said unit, a mount fixed on an upper end of the piston rod adapted for attachment to the sprung mass, an annular support member located subjacent the upper mount, a metal-to-metal jounce stop arrangement for the assembly comprising:

means supporting an annular radially extending jounce stopper ledge adjacent said unit upper end;

a cylindrical metal canister fixed to and extending downwardly from an underside of the support member concentrically disposed on said unit principal axis, an elastomeric jounce bumper concentrically positioned on an upper portion of the rod having an upper end face in flush abutment with a central portion of the support member and a lower end face spaced a predetermined dimension above said unit upper end with the assembly in a static design mode;

said canister in said design mode concentrically encircling an upper portion of said bumper with its lower extremity defining an annular stopper edge vertically positioned intermediate said bumper upper and lower end faces so as to define a predetermined maximum axial jounce dimension between said canister stopper edge and said unit stopper ledge;

wherein upon the assembly undergoing maximum jounce travel said canister stopper edge contacting said unit stopper ledge said jounce bumper being compressed a predetermined axial dimension between said support member and said unit upper end obviating over-compression of said bumper thereby increasing the service-life thereof.

2. The shock-absorbing assembly as set forth in claim 1 wherein said supporting means in the form of an annular striker plate fixed on said unit upper end, said striker plate bordered by a downwardly and outwardly extending frusto-conical shaped skirt terminating in said annular stopper ledge, said striker plate skirt adapted to provide a lead-in surface for said canister stopper edge.

3. The shock absorbing assembly as set forth in claim 1 wherein a lower end portion of said canister formed with an annular inturned shoulder, a concentric ring portion depending from said shoulder portion and terminating in a return bent flanged hem surrounding the exterior of said ring portion, whereby said flanged hem defining a free upper edge spaced a predetermined axial dimension below said inturned shoulder so as to form therewith an annular groove, said groove adapted to receive therein an annular rib formed on an internal surface of an elastomeric dust tube thereby retaining said dust tube in a concentric shielding manner about said unit, and wherein said canister stopper edge in the form of an annular folded end juncture defined by said return bent flanged hem.

4. The shock absorbing assembly as set forth in claim 1 wherein said support member comprising an upper coil spring seat formed with a central annular base disc encircled by an upturned concentric annular flange, said upturned flange formed with a radially outwardly extending upper bight wall terminating in a downturned flange, whereby said upturned flange, said upper bight wall and said downturned flange defining a downwardly opening U-sectioned trough.

5. The shock absorbing assembly as set forth in claim 4 wherein said canister formed at its upper extremity with a radially outwardly extending flanged collar, said canister upper extremity comprising an open end having an internal diameter sized so as to snugly encircle said spring seat base disc upturned flange, such that said canister flanged collar in flush welded abutment with an undersurface of said spring seat bight wall.

\* \* \* \* \*